(12) United States Patent
Resconi et al.

(10) Patent No.: US 7,569,647 B2
(45) Date of Patent: Aug. 4, 2009

(54) PROCESS FOR THE COPOLYMERIZATION OF ETHYLENE

(75) Inventors: Luigi Resconi, Ferrara (IT); Nicoletta Mascellani, Bondeno (FE) (IT)

(73) Assignee: Basell Polyolefine GmbH, Wesseling (DE)

( * ) Notice: Subject to any disclaimer, the term of this patent is extended or adjusted under 35 U.S.C. 154(b) by 0 days.

(21) Appl. No.: 10/529,532

(22) PCT Filed: Sep. 10, 2003

(86) PCT No.: PCT/EP03/10107

§ 371 (c)(1),
(2), (4) Date: Mar. 29, 2005

(87) PCT Pub. No.: WO2004/033510

PCT Pub. Date: Apr. 22, 2004

(65) Prior Publication Data

US 2006/0167195 A1    Jul. 27, 2006

Related U.S. Application Data

(60) Provisional application No. 60/418,883, filed on Oct. 15, 2002.

(30) Foreign Application Priority Data

Oct. 10, 2002 (EP) ................................. 02079195

(51) Int. Cl.
*C08F 4/64* (2006.01)
*C08F 4/72* (2006.01)
*C08F 4/52* (2006.01)

(52) U.S. Cl. .................. 526/160; 526/170; 526/943; 526/941; 526/127; 526/348; 526/348.2; 526/348.5; 526/348.6; 526/339; 526/340.3

(58) Field of Classification Search .............. 526/349, 526/336, 160, 161, 170, 172, 129, 943, 348
See application file for complete search history.

(56) References Cited

U.S. PATENT DOCUMENTS

| | | | | |
|---|---|---|---|---|
| 5,565,533 A | * | 10/1996 | Galimberti et al. | 526/127 |
| 5,585,448 A | * | 12/1996 | Resconi et al. | 526/170 |
| 5,786,432 A | | 7/1998 | Küber et al. | 526/127 |
| 5,840,947 A | * | 11/1998 | Kuber et al. | 556/8 |
| 6,051,728 A | * | 4/2000 | Resconi et al. | 556/53 |
| 6,350,830 B1 | * | 2/2002 | Gores et al. | 526/159 |
| 6,376,407 B1 | * | 4/2002 | Burkhardt et al. | 502/103 |
| 6,391,989 B1 | * | 5/2002 | Bohnen et al. | 526/134 |
| 6,444,606 B1 | * | 9/2002 | Bingel et al. | 502/152 |
| 6,444,833 B1 | | 9/2002 | Ewen et al. | |
| 6,482,902 B1 | * | 11/2002 | Bohnen et al. | 526/127 |
| 6,492,539 B1 | * | 12/2002 | Bingel et al. | 556/11 |
| 6,500,908 B1 | * | 12/2002 | Bohnen et al. | 526/160 |
| 6,635,779 B1 | | 10/2003 | Ewen et al. | |
| 6,723,794 B2 | * | 4/2004 | Kawasaki et al. | 525/213 |
| 6,930,190 B2 | | 8/2005 | Nifant'ev et al. | |
| 6,953,829 B2 | * | 10/2005 | Kratzer et al. | 526/160 |

(Continued)

FOREIGN PATENT DOCUMENTS

| | | |
|---|---|---|
| DE | 19917985 | 10/2000 |
| EP | 0633272 | 1/1995 |
| EP | 0775707 | 5/1997 |
| WO | 9102012 | 2/1991 |
| WO | 9200333 | 1/1992 |

(Continued)

*Primary Examiner*—David Wu
*Assistant Examiner*—Rip A. Lee
(74) *Attorney, Agent, or Firm*—William R. Reid

(57) ABSTRACT

A process for producing a copolymer of ethylene containing from 0.1 to 99% by mol of one or more derived units of alpha-olefins of formula $CH_2=CHA$, wherein A is a $C_2$-$C_{20}$ alkyl radical, comprising contacting, under polymerization conditions, ethylene and one or more alpha-olefins in the presence of a catalyst system obtainable by contacting: a) a metallocene compound of formula (I): wherein M is zirconium, titanium or hafnium; X, same or different, is a hydrogen atom, a halogen atom, or an hydrocarbon group; $R^1$, is a hydrocarbon group; $R^2$ $R^3$, $R^4$, R5 and $R^6$, are hydrogen atoms or hydrocarbon groups; Q is a radical of formula (II), being bonded to the indenyl at the position marked by the symbol *; (II) wherein: $T^1$, $T^2$, $T^3$, $T^4$ and $T^5$, are carbon atoms (C) or nitrogen atoms (N); $m^1$, $m^2$, $m^3$, $m^4$ and $m^5$ are 0 or 1; $R^7$, $R^8$, $R^9$, $R^{10}$ and $R^{11}$ are hydrogen atoms or hydrocarbon groups; and b) an alumoxane or a compound capable of forming an alkyl metallocene cation.

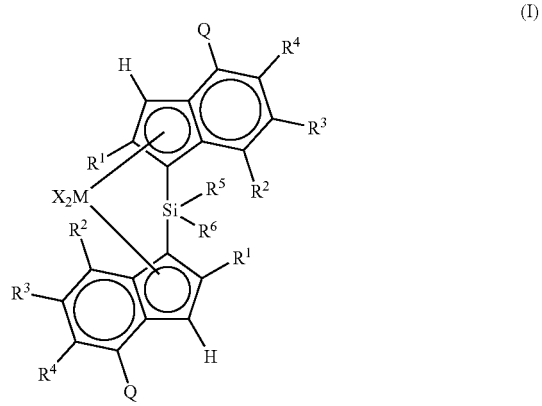

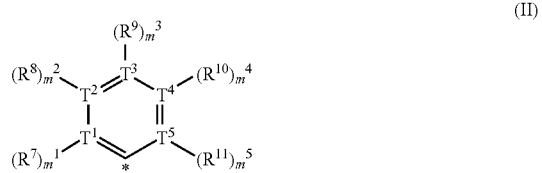

5 Claims, No Drawings

U.S. PATENT DOCUMENTS

| | | | |
|---|---|---|---|
| 7,074,864 | B2 | 7/2006 | Resconi |
| 7,122,498 | B2 * | 10/2006 | Hart et al. .................. 502/152 |
| 7,141,637 | B2 | 11/2006 | Elder et al. |
| 7,342,078 | B2 * | 3/2008 | Schottek et al. ............. 526/160 |
| 2003/0008984 | A1 | 1/2003 | Kratzer et al. .............. 526/127 |
| 2003/0013913 | A1 | 1/2003 | Schottek et al. ................ 564/8 |
| 2005/0234204 | A1 | 10/2005 | Resconi et al. |
| 2006/0052553 | A1 | 3/2006 | Resconi et al. |
| 2006/0084769 | A1 | 4/2006 | Resconi et al. |
| 2006/0094840 | A1 | 5/2006 | Resconi et al. |
| 2007/0149729 | A1 | 6/2007 | Resconi |

FOREIGN PATENT DOCUMENTS

| | | |
|---|---|---|
| WO | 9532995 | 12/1995 |
| WO | 9840331 | 9/1998 |
| WO | 9840416 | 9/1998 |
| WO | WO 98/40331 A1 * | 9/1998 |
| WO | WO 98/40416 A1 * | 9/1998 |
| WO | 9921899 | 5/1999 |
| WO | WO 99/18135 A1 * | 5/1999 |
| WO | WO 99/43717 A1 * | 7/1999 |
| WO | WO 99/40129 A1 * | 8/1999 |
| WO | WO 99/42497 * | 8/1999 |
| WO | 0044799 | 8/2000 |
| WO | 0121674 | 3/2001 |
| WO | WO 01/47635 A2 * | 5/2001 |
| WO | 01/44318 | 6/2001 |
| WO | 0146274 | 6/2001 |
| WO | 0147635 | 7/2001 |
| WO | 0148034 | 7/2001 |
| WO | 0148035 | 7/2001 |
| WO | WO 01/48034 A2 * | 7/2001 |
| WO | 0162764 | 8/2001 |
| WO | 0202575 | 1/2002 |
| WO | 02/100909 | 12/2002 |
| WO | 03/014107 | 2/2003 |
| WO | 03/045964 | 6/2003 |
| WO | 2004/005360 | 1/2004 |
| WO | 2004/022613 | 3/2004 |
| WO | 2004/050713 | 6/2004 |
| WO | 2004/050724 | 6/2004 |

* cited by examiner

PROCESS FOR THE COPOLYMERIZATION OF ETHYLENE

This application is the U.S. national phase of International Application PCT/EP2003/010107, filed Sep. 10, 2003, claiming priority to European Patent Application 02079195.0 filed Oct. 10, 2002, and the benefit under 35 U.S.C. 119(e) of U.S. Provisional Application No. 60/418,883, filed Oct. 15, 2002; the disclosures of International Application PCT/EP2003/010107, European Patent Application 02079195.0 and U.S. Provisional Application No. 60/418,883, each as filed, are incorporated herein by reference.

The present invention relates to a process for the copolymerization of ethylene and one or more alpha-olefins of formula $CH_2=CHA$, wherein A is a $C_2$-$C_{20}$ alkyl radical, in the presence of a metallocene catalyst.

It is known that polyethylene can be modified by the addition, during the polymerization reaction, of small quantities of alpha-olefins, generally 1-butene, 1-hexene or 1-octene. This modification gives ethylene copolymers which have short branches along the main chain due to the units derived from the alpha-olefin comonomers. The branches have the effect that the degree of crystallinity and hence the density of the copolymer turn out to be lower than in polyethylene homopolymer. Typically, ethylene copolymers have densities of the order of 0.915-0.940 g/cm³ associated to advantageous mechanical properties, in particular for the production of films.

The lowering of the degree of crystallinity and of the density of the copolymers depends on the type and quantity of the incorporated alpha-olefin. In general, the greater the quantity of incorporated alpha-olefin, the lower are the resulting degrees of crystallinity and density. Besides the type and quantity of the incorporated alpha-olefin comonomer, the properties of the copolymer depend on the distribution of the branches along the polymer chain. In particular, a uniform distribution of the branches has relevant effects on the properties of the copolymers. In fact, with the same type and quantity of incorporated alpha-olefin, a higher uniformity of distribution allows lower degrees of crystallinity and density to be obtained. Metallocene compounds having two bridged cyclopentadienyl groups are known as catalyst components for the homo- and copolymerization reaction of ethylene. A main drawback of the use of metallocene catalysts is that the comonomer incorporation ability is quite low, and therefore it is necessary to use a large excess of comonomer in order to achieve copolymers having the desired comonomer content. Moreover it is often difficult to tune the comonomer content in a copolymer.

Bis indenyl metallocene compounds having the indenyl moieties substituted in 4 position with a substituted phenyl group are known, for example, in WO 98/40331, but they have never been used for obtaining ethylene copolymer.

Thus it would be desirable to find a metallocene catalyst having an improved balance of properties, i.e. a good comonomer incorporation ability in such a way that it is possible to use a small excess of comonomer in the reactor, maintaining at the same time a good distribution of the comonomer in the molecular chain so to achieve polymer having lower Tg. Moreover, the same time, the metallocene catalyst should produce copolymers having high molecular weight.

According to an aspect of the present invention, it is provided a process for producing a copolymer of ethylene containing from 0.1 to 99% by mol of derived units of one or more alpha-olefins of formula $CH_2=CHA$, wherein A is a $C_2$-$C_{20}$ alkyl radical and optionally up to 5% by mol of a polyene, comprising contacting, under polymerization conditions, ethylene, one or more alpha-olefins and optionally said polyene, in the presence of a catalyst system obtainable by contacting:
a) a metallocene compound of formula (I):

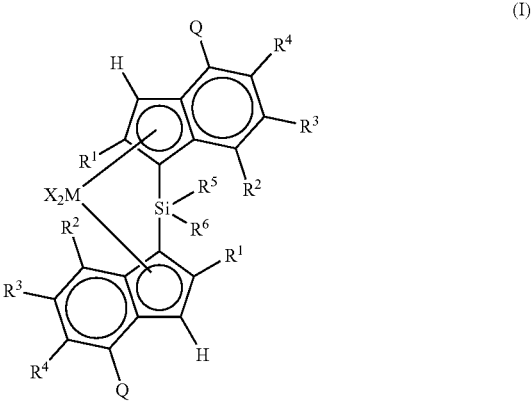

wherein

M is zirconium, titanium or hafnium; preferably M is zirconium or hafnium; more preferably M is zirconium;

X, equal to or different from each other, is a hydrogen atom, a halogen atom, a R, OR, OR'O, $OSO_2CF_3$, OCOR, SR, $NR_2$ or $PR_2$ group, wherein the R substituents are linear or branched, saturated or unsaturated $C_1$-$C_{20}$-alkyl, $C_3$-$C_{20}$-cycloalkyl, $C_6$-$C_{20}$-aryl, $C_7$-$C_{20}$-alkylaryl, $C_7$-$C_{20}$-arylalkyl radicals, optionally containing one or more heteroatoms belonging to groups 13-17 of the Periodic Table of the Elements; and the R' substituent is a $C_1$-$C_{40}$-alkylidene, $C_6$-$C_{40}$-arylidene, $C_7$-$C_{40}$-alkylarylidene or $C_7$-$C_{40}$-arylalkylidene; preferably X is a halogen atom, a R, OR'O or OR group; more preferably X is chlorine or methyl;

$R^1$, equal to or different from each other, is a linear or branched $C_1$-$C_{20}$-alkyl radical; preferably $R^1$ is a linear $C_1$-$C_{10}$-alkyl radical more preferably it is methyl or ethyl;

$R^2$, equal to or different from each other, is a hydrogen atom or a linear or branched, saturated or unsaturated $C_1$-$C_{20}$-alkyl radical;

$R^3$ and $R^4$, equal to or different from each other, are hydrogen atoms or linear or branched, saturated or unsaturated $C_1$-$C_{20}$-alkyl, $C_3$-$C_{20}$-cycloalkyl, $C_6$-$C_{20}$-aryl, $C_7$-$C_{20}$-alkylaryl or $C_7$-$C_{20}$-arylalkyl radicals, optionally containing one or more heteroatoms belonging to groups 13-17 of the Periodic Table of the Elements; or they can form together a condensed saturated or unsaturated 5 or 6 membered ring, optionally containing one or more heteroatoms belonging to groups 13-16 of the Periodic Table of the Elements, said ring optionally bearing one or more substituents; preferably $R^3$ and $R^4$ are hydrogen atoms, methyl groups or they form a condensed saturated or unsaturated 5 or 6 membered ring;

$R^5$ and $R^6$, equal to or different from each other, are hydrogen atoms or linear or branched, saturated or unsaturated $C_1$-$C_{20}$-alkyl, $C_3$-$C_{20}$-cycloalkyl, $C_6$-$C_{20}$-aryl, $C_7$-$C_{20}$-alkylaryl, or $C_7$-$C_{20}$-arylalkyl radicals, optionally containing one or more heteroatoms belonging to groups 13-17 of the Periodic Table of the Elements; or they can form together a condensed saturated or unsaturated 5 or 6 membered ring, optionally containing one or more heteroatoms belonging to groups 13-16 of the Periodic Table of the Elements, said ring optionally bearing one or more substituents; preferably $R^5$ and $R^6$ are $C_1$-$C_{20}$-alkyl or $C_6$-$C_{20}$-aryl radicals; more preferably they are methyl or phenyl;

Q is a radical of formula (II), which is bonded to the indenyl at the position marked by the symbol *;

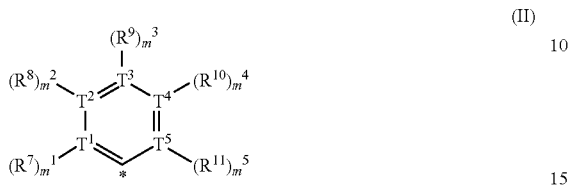

(II)

wherein $T^1$, $T^2$, $T^3$, $T^4$ and $T^5$, equal to or different from each other, are carbon atoms (C) or nitrogen atoms (N);

$m^1$, $m^2$, $m^3$, $m^4$ and $m^5$ are 0 or 1; more precisely each of $m^1$, $m^2$, $m^3$, $m^4$ and $m^5$ is 0 when the correspondent $T^1$, $T^2$, $T^3$, $T^4$ and $T^5$ is a nitrogen atom and it is 1 when the correspondent $T^1$, $T^2$, $T^3$, $T^4$ and $T^5$ is a carbon atom;

$R^7$, $R^8$, $R^9$, $R^{10}$ and $R^{11}$, equal to or different from each other, are hydrogen atoms or linear or branched, saturated or unsaturated $C_1$-$C_{20}$-alkyl, $C_3$-$C_{20}$-cycloalkyl, $C_6$-$C_{20}$-aryl, $C_7$-$C_{20}$-alkylaryl, $C_7$-$C_{20}$-arylalkyl radicals, optionally containing one or more heteroatoms belonging to groups 13-17 of the Periodic Table of the Elements; or they can form together a condensed saturated or unsaturated 5 or 6 membered ring, optionally containing one or more heteroatoms belonging to groups 13-16 of the Periodic Table of the Elements; said rings can bear one or more substituents; with the provisos that at least one of $R^7$, $R^8$, $R^9$, $R^{10}$ and $R^{11}$ is different from hydrogen atom, and that no more than two of $T^1$, $T^2$, $T^3$, $T^4$ and $T^5$ are nitrogen atoms;

b) an alumoxane or a compound capable of forming an alkyl metallocene cation; and optionally c) an organo aluminum compound.

In a preferred embodiment, $R^9$ is a linear or branched, saturated or unsaturated $C_1$-$C_{20}$-alkyl, $C_3$-$C_{20}$-cycloalkyl, $C_6$-$C_{20}$-aryl, $C_7$-$C_{20}$-alkylaryl or $C_7$-$C_{20}$-arylalkyl radical; and $R^7$, $R^8$, $R^{10}$ and $R^{11}$ are hydrogen atoms.

In another preferred embodiment $R^8$ and $R^{10}$ are a linear or branched, saturated or unsaturated $C_1$-$C_{20}$-alkyl, $C_3$-$C_{20}$-cycloalkyl, $C_6$-$C_{20}$-aryl, $C_7$-$C_{20}$-alkylaryl, $C_7$-$C_{20}$-arylalkyl radicals; and $R^7$, $R^9$ and $R^{11}$ are hydrogen atoms;

A preferred radical belonging to formula (II) has formula (IIa) being bonded to the indenyl at the position indicated by the symbol *:

(IIa)

wherein $R^9$ is a branched, saturated or unsaturated $C_1$-$C_{20}$-alkyl or $C_6$-$C_{20}$-aryl radical; more preferably $R^9$ is a phenyl group, optionally substituted with one or more $C_1$-$C_{10}$ alkyl groups, or a group of formula $C(R^{12})_3$ wherein $R^{12}$, same or different, is a linear or branched, saturated or unsaturated $C_1$-$C_6$-alkyl radical; preferably $R^{12}$ is methyl.

A further preferred radical belonging to formula (II) has formula (IIb) being bonded to the indenyl at the position indicated by the symbol *:

(IIb)

wherein $R^8$ and $R^{10}$ are a branched, saturated or unsaturated $C_1$-$C_{20}$-alkyl or a $CF_3$ radical; more preferably they are a group of formula $C(R^{12})_3$ wherein $R^{12}$ has been described above;

$R^9$ is a hydrogen atom or a linear or branched, saturated or unsaturated $C_1$-$C_{20}$-alkyl or $C_6$-$C_{20}$-aryl radical optionally containing one or more heteroatoms belonging to groups 13-17 of the Periodic Table of the Elements; preferably $R^9$ is a hydrogen atom.

A further preferred radical belonging to formula (II) has formula (IIc) being bonded to the indenyl at the position indicated by the symbol *:

(IIc)

wherein at least one among $R^8$, $R^9$, $R^{10}$ and $R^{11}$ is different from a hydrogen atom; preferably $R^{10}$ and $R^{11}$ are hydrogen atoms; preferably $R^8$ and $R^9$ are a linear or branched, saturated or unsaturated $C_1$-$C_{20}$-alkyl radical, or they form a saturated or unsaturated condensed 5 or 6 membered ring optionally containing one or more heteroatoms belonging to groups 13-16 of the Periodic Table of the Elements, said ring optionally bearing one or more substituents; more preferably $R^8$ and $R^9$ form a saturated or unsaturated condensed 5 or 6 membered ring optionally containing one or more heteroatoms belonging to groups 15-16 of the Periodic table;

A further preferred radical belonging to formula (II) has formula (IId), being bonded to the indenyl at the position indicated by the symbol *:

(IId)

wherein:

R[10] and R[11] are a linear or branched, saturated or unsaturated $C_1$-$C_{20}$-alkyl radical, or they form a saturated or unsaturated condensed 5 or 6 membered ring optionally containing one or more heteroatoms belonging to groups 13-16 of the Periodic Table of the Elements, said ring optionally bearing one or more substituents; more preferably R[10] and R[11] form a saturated or unsaturated condensed 5 or 6 membered ring optionally containing one or more heteroatoms belonging to groups 15-16 of the Periodic table; such as phenyl ring, pyrrole ring, piridine ring;

said catalyst system further comprising:

Preferably the metallocene compound of formula (I) is in the racemic form.

Non limitative examples of compounds of formula (I) are:

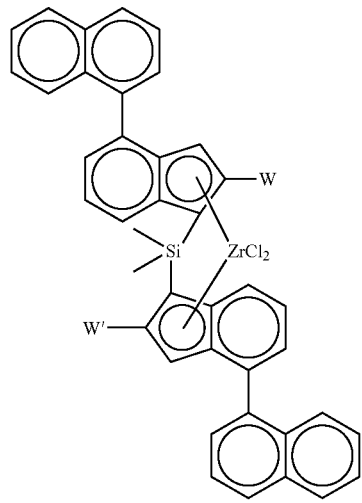

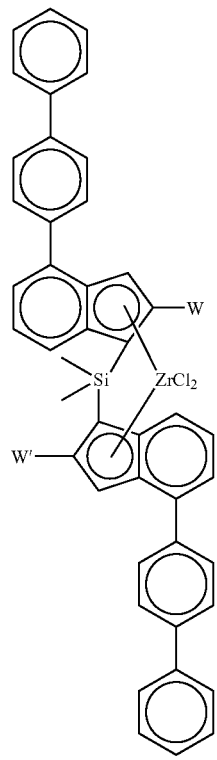

-continued

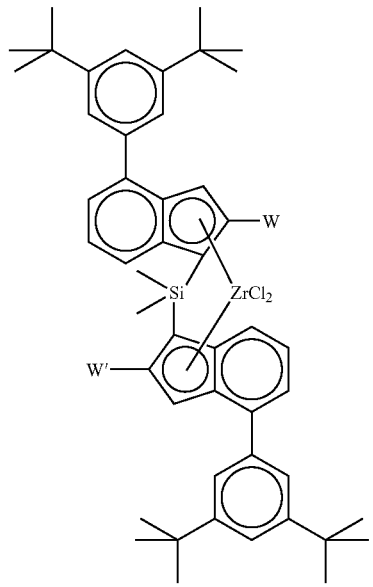

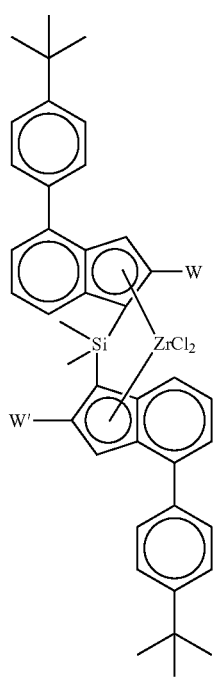

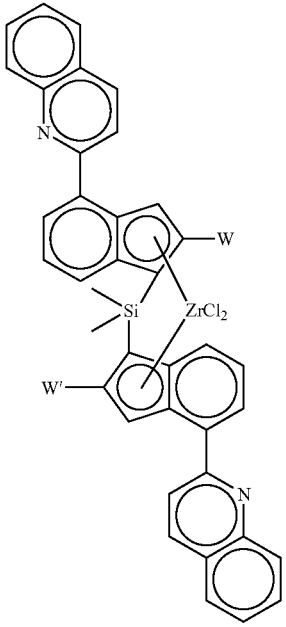

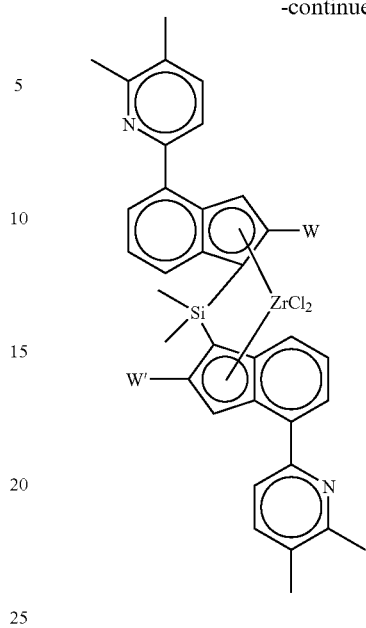

Wherein W and W' are methyl or ethyl radicals.

Compounds of formula (I) are well know in the art. They can be prepared, for example, as described in to WO 98/40331.

Alumoxanes used as component b) can be obtained by reacting water with an organo-aluminium compound of formula $H_jAlU_{3-j}$ or $H_jAl_2U_{6-j}$, where the U substituents, same or different, are hydrogen atoms, halogen atoms, $C_1$-$C_{20}$-alkyl, $C_3$-$C_{20}$-cyclalkyl, $C_6$-$C_{20}$-aryl, $C_7$-$C_{20}$-alkylaryl or $C_7$-$C_{20}$-arylalkyl radical, optionally containing silicon or germanium atoms, with the proviso that at least one U is different from halogen, and j ranges from 0 to 1, being also a non-integer number. In this reaction the molar ratio of Al/water is preferably comprised between 1:1 and 100:1.

The molar ratio between aluminium and the metal of the metallocene generally is comprised between about 10:1 and about 30000:1, preferably between about 100:1 and about 5000:1.

The alumoxanes used in the catalyst according to the invention are considered to be linear, branched or cyclic compounds containing at least one group of the type:

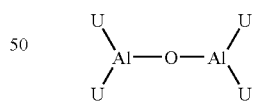

wherein the substituents U, same or different, are described above.

In particular, alumoxanes of the formula:

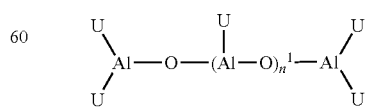

can be used in the case of linear compounds, wherein $n^1$ is 0 or an integer of from 1 to 40 and the substituents U are defined as above, or alumoxanes of the formula:

can be used in the case of cyclic compounds, wherein $n^2$ is an integer from 2 to 40 and the U substituents are defined as above.

Examples of alumoxanes suitable for use according to the present invention are methylalumoxane (MAO), tetra-(isobutyl)alumoxane (TIBAO), tetra-(2,4,4-trimethyl-pentyl)alumoxane (TIOAO), tetra-(2,3-dimethylbutyl)alumoxane (TDMBAO) and tetra-(2,3,3-trimethylbutyl)alumoxane (TTMBAO).

Particularly interesting alumoxanes are those described in WO 99/21899 and in WO01/21674 in which the alkyl and aryl groups have specific branched patterns.

Non-limiting examples of aluminium compounds according to WO 99/21899 and WO01/21674 are:

tris(2,3,3-trimethyl-butyl)aluminium, tris(2,3-dimethyl-hexyl)aluminium, tris(2,3-dimethyl-butyl)aluminium, tris(2,3-dimethyl-pentyl)aluminium, tris(2,3-dimethyl-heptyl)aluminium, tris(2-methyl-3-ethyl-pentyl)aluminium, tris(2-methyl-3-ethyl-hexyl)aluminium, tris(2-methyl-3-ethyl-heptyl)aluminium, tris(2-methyl-3-propyl-hexyl)aluminium, tris(2-ethyl-3-methyl-butyl)aluminium, tris(2-ethyl-3-methyl-pentyl)aluminium, tris(2,3-diethyl-pentyl)aluminium, tris(2-propyl-3-methyl-butyl)aluminium, tris(2-isopropyl-3-methyl-butyl)aluminium, tris(2-isobutyl-3-methyl-pentyl)aluminium, tris(2,3,3-trimethyl-pentyl)aluminium, tris(2,3,3-trimethyl-hexyl)aluminium, tris(2-ethyl-3,3-dimethyl-butyl)aluminium, tris(2-ethyl-3,3-dimethyl-pentyl)aluminium, tris(2-isopropyl-3,3-dimethyl-butyl)aluminium, tris(2-trimethylsilyl-propyl)aluminium, tris(2-methyl-3-phenyl-butyl)aluminium, tris(2-ethyl-3-phenyl-butyl)aluminium, tris(2,3-dimethyl-3-phenyl-butyl)aluminium, tris(2-phenyl-propyl)aluminium, tris[2-(4-fluorophenyl)-propyl]aluminium, tris[2-(4-chloro-phenyl)-propyl]aluminium, tris[2-(3-isopropyl-phenyl)-propyl]aluminium, tris(2-phenyl-butyl)aluminium, tris(3-methyl-2-phenyl-butyl)aluminium, tris(2-phenyl-pentyl)aluminium, tris[2-(pentafluorophenyl)-propyl]aluminium, tris[2,2-diphenyl-ethyl]aluminium and tris[2-phenyl-2-methyl-propyl]aluminium, as well as the corresponding compounds wherein one of the hydrocarbyl groups is replaced with a hydrogen atom, and those wherein one or two of the hydrocarbyl groups are replaced with an isobutyl group.

Amongst the above aluminium compounds, trimethylaluminium (TMA), triisobutylaluminium (TIBAL), tris(2,4,4-trimethyl-pentyl)aluminium (TIOA), tris(2,3-dimethylbutyl) aluminium (TDMBA) and tris(2,3,3-trimethylbutyl) aluminium (TTMBA) are preferred.

Non-limiting examples of compounds able to form an alkylmetallocene cation are compounds of formula $D^+E^-$, wherein $D^+$ is a Brønsted acid, able to donate a proton and to react irreversibly with a substituent X of the metallocene of formula (I) and $E^-$ is a compatible anion, which is able to stabilize the active catalytic species originating from the reaction of the two compounds, and which is sufficiently labile to be able to be removed by an olefinic monomer. Preferably, the anion $E^-$ comprises of one or more boron atoms. More preferably, the anion $E^-$ is an anion of the formula $BAr_4^{(-)}$, wherein the substituents Ar which can be identical or different are aryl radicals such as phenyl, pentafluorophenyl or bis (trifluoromethyl)phenyl. Tetrakis-pentafluorophenyl borate is particularly preferred examples of these compounds are described in WO 91/02012. Moreover, compounds of the formula $BAr_3$ can conveniently be used. Compounds of this type are described, for example, in the published International patent application WO 92/00333. Other examples of compounds able to form an alkylmetallocene cation are compounds of formula $BAr_3P$ wherein P is a substituted or unsubstituted pyrrol radicals. These compounds are described in WO01/62764. Other examples of cocatalyst can be found in EP 775707 and DE 19917985. Compounds containing boron atoms can be conveniently supported according to the description of WO 01/47635 and WO 01/48035. All these compounds containing boron atoms can be used in a molar ratio between boron and the metal of the metallocene comprised between about 1:1 and about 10:1; preferably 1:1 and 2.1; more preferably about 1:1.

Non limiting examples of compounds of formula $D^+E^-$ are:

Triethylammoniumtetra(phenyl)borate,

Tributylammoniumtetra(phenyl)borate,

Trimethylammoniumtetra(tolyl)borate,

Tributylammoniumtetra(tolyl)borate,

Tributylammoniumtetra(pentafluorophenyl)borate,

Tributylammoniumtetra(pentafluorophenyl)aluminate,

Tripropylammoniumtetra(dimethylphenyl)borate,

Tributylammoniumtetra(trifluoromethylphenyl)borate,

Tributylammoniumtetra(4-fluorophenyl)borate,

N,N-Dimethylbenzylammonium-tetrakispentafluorophenylborate,

N,N-Dimethylhexylamonium-tetrakispentafluorophenylborate,

N,N-Dimethylaniliniumtetra(phenyl)borate,

N,N-Diethylaniliniumtetra(phenyl)borate,

N,N-Dimethylaniliniumtetrakis(pentafluorophenyl)borate,

N,N-Dimethylaniliniumtetrakis(pentafluorophenyl)aluminate,

N,N-Dimethylbenzylammonium-tetrakispentafluorophenylborate,

N,N-Dimethylhexylamonium-tetrakispentafluorophenylborate,

Di(propyl)ammoniumtetrakis(pentafluorophenyl)borate,

Di(cyclohexyl)ammoniumtetrakis(pentafluorophenyl)borate,

Triphenylphosphoniumtetrakis(phenyl)borate,

Triethylphosphoniumtetrakis(phenyl)borate,

Diphenylphosphoniumtetrakis(phenyl)borate,

Tri(methylphenyl)phosphoniumtetrakis(phenyl)borate,

Tri(dimethylphenyl)phosphoniumtetrakis(phenyl)borate,

Triphenylcarbeniumtetrakis(pentafluorophenyl)borate,

Triphenylcarbeniumtetrakis(pentafluorophenyl)aluminate,

Triphenylcarbeniumtetrakis(phenyl)aluminate,

Ferroceniumtetrakis(pentafluorophenyl)borate,

Ferroceniumtetrakis(pentafluorophenyl)aluminate.

Triphenylcarbeniumtetrakis(pentafluorophenyl)borate, and N,N-Dimethylaniliniumtetrakis(pentafluorophenyl)borate.

Organic aluminum compounds used as compound c) are those of formula $H_jAlU_{3-j}$ or $H_jAl_2U_{6-j}$ described above.

The catalysts system used in the process of the present invention can also be supported on an inert carrier. This is achieved by depositing the metallocene compound a) or the product of the reaction thereof with the component b), or the component b) and then the metallocene compound a) on an inert support such as, for example, silica, alumina, Al—Si, Al—Mg mixed oxides, magnesium halides, styrene/divinylbenzene copolymers, polyethylene or polypropylene. The supportation process is carried out in an inert solvent such as an hydrocarbon (for example toluene, hexane, pentane or propane) at a temperature ranging from 0° C. to 100° C. and preferably at a temperature ranging from 25° C. to 90° C.

A suitable class of inert supports is constituted by porous organic supports functionalized with groups having active hydrogen atoms. Particularly suitable are those in which the organic support is a partially crosslinked styrene polymer. Supports of this type are described in European application EP-633 272.

Another class of inert supports particularly suitable for use according to the invention is that of polyolefin porous prepolymers, particularly polyethylene.

A further suitable class of inert supports for use according to the invention is that of porous magnesium halides, such as those described in International application WO 95/32995.

The solid compound thus obtained, optionally in combination with alkylaluminium compound, either as such or prereacted with water, can be usefully employed in gas-phase polymerization. The process for the polymerization of olefins according to the invention can be carried out in the liquid phase, in the presence or absence of an inert hydrocarbon solvent, or in the gas phase. The hydrocarbon solvent can either be aromatic such as toluene, or aliphatic such as propane, hexane, heptane, isobutane or cyclohexane.

The polymerization temperature is generally comprised between −100° C. and +100° C. and, particularly between 10° C. and +90° C. The polymerization pressure is generally comprised between 0.5 and 100 bar.

The lower the polymerization temperature, the higher are the resulting molecular weights of the polymers obtained.

The polymerization yields depend on the purity of the metallocene compound of the catalyst system. The metallocene compounds obtained by the process of the invention can therefore be used as such or can be subjected to purification treatments.

The components of the catalyst system can be brought into contact with each other before the polymerization. The precontact concentrations are generally between 0.1 and $10^{-8}$ mol/l for the metallocene component a), while they are generally between 2 and $10^{-8}$ mol/l for the component b). The pre-contact is generally effected in the presence of a hydrocarbon solvent and, if appropriate, of small quantities of monomer. In the pre-contact it is also possible to use a non-polymerizable olefin, such as isobutene, 2-butene and the like.

The molecular weight distribution can be varied by using mixtures of different metallocene compounds or by carrying out the polymerization in several stages which differ as to the polymerization temperature and/or the concentrations of the molecular weight regulators and/or the monomers concentration. Moreover, by carrying out the polymerization process by using a combination of two different metallocene compounds of formula (I), a polymer endowed with a broad molecular weight distribution is produced.

In the copolymers obtainable by the process of the invention, the content of ethylene derived units is between 99.9% by mol and 1% by mol; preferably is it between 99% by mol and 70% by mol; and more preferably it is between 95% by mol and 60% by mol.

The content of alpha-olefins derived units is between 0.1% by mol and 99% by mol; preferably is it between 1% by mol and 30% by mol; and more preferably it is between 5% by mol and 40% by mol.

Non-limiting examples of alpha-olefins of formula $CH_2$=CHA which can be used as alpha-olefins in the process of the invention are 1-butene, 1-pentene, 4-methyl-1-pentene, 1-hexene, 1-octene, 4,6-dimethyl-1-heptene, 1-decene, 1-dodecene, 1-tetradecene, 1-hexadecene, 1-octadecene and 1-eicosene. Preferred comonomers are 1-pentene, 1-hexene and 1-octene.

The content of polyene derived units is preferably comprised between 0% and 5% by mol and, more preferably between 0 and 3 by mol %.

The polyenes that can be used as comonomers in the copolymers according to the present invention are included in the following classes:
- non-conjugated diolefins able to cyclopolymerize such as, for example, 1,5-hexadiene, 1-6-heptadiene, 2-methyl-1,5-hexadiene;
- dienes capable of giving unsaturated monomeric units, in particular conjugated dienes such as, for example, butadiene and isoprene, and linear non-conjugated dienes, such as, for example, trans 1,4-hexadiene, cis 1,4-hexadiene, 6-methyl-1,5-heptadiene, 3,7-dimethyl-1,6-octadiene, 11-methyl-1,10-dodecadiene, and cyclic non-conjugated dienes such as 5-ethylidene-2-norbornene.

With a process of the present invention it is possible to achieve a good balance of different properties. In fact, with the process of the present invention the incorporation of the comonomer is high and this allows the use of a smaller excess of comonomer in the reactor and to achieve e better tunable process. At the same time the comonomer is well distributed, as shown by the r1×r2 values and by the glass transition temperature. Moreover the copolymers obtained with the process of the present invention have a high molecular weight (I.V.) that makes the process object of the present invention suitable for an industrial use.

The intrinsic viscosity values are generally higher than 0.5 dL/g, preferably they are between from 1.5 to 10 dL/g; and more preferably between 2 and 4 dL/g.

The following examples are given for illustrative purposes and do not intend to limit the invention.

EXAMPLES

General Procedures

All operations were performed under nitrogen by using conventional Schlenk-line techniques. Heptane and toluene were purified by degassing with $N_2$ and passing over activated (8 hours, $N_2$ purge, 300° C.) $Al_2O_3$, and stored under nitrogen. 1-hexene (Aldrich) was dried over alumina and distilled over $LiAlH_4$. Polymerization grade ethylene was obtained from the Basell Ferrara plant. MAO (methylalumoxane, Witco) was purchased as a 10 wt.-% solution in toluene, dried under vacuum to remove most of the free trimethylaluminium and used as 1 M toluene solution. TIBA (Al(i-Bu)$_3$, Witco) was used as 1 M toluene solution.

$^1$H NMR spectra of copolymers were recorded at 120° C. on a Bruker DPX-400 spectrometer operating at 100.61 MHz, in the Fourier transform mode. The samples were prepared by dissolving 10 mg of copolymer in 0.5 mL of 1,1,2,2-tetrachloroethane-d$_2$ at 120° C. The peak of C$_2$HDCl$_2$ (5.95 ppm) was used as internal standard. Each spectrum was acquired with a 45° pulse and 20 seconds of delay between pulses. About 16 transients were stored in 32K data points using a spectral window of 16 ppm.

The 1-hexene content in the copolymers was calculated from the methylene and methyne peak integral ($I_A$) and the methyl peak integral ($I_B$), by applying the following relationships:

$$[C_6]=I_B/3$$

$$[C_2]=(I_A-3I_B)/4$$

$$\Sigma=[C_6]+[C_2]=(I_B/3)+(I_A-3I_B)/4$$

$$C_{6\,copol}(\%mol)=100\times[C_6]/\Sigma=100\times I_B/3\Sigma$$

The molecular weight distribution was determined on a WATERS 150 C using the following chromatographic conditions:

| | |
|---|---|
| Columns: | 3× SODEX AT 806 MS; 1× SODEX UT 807; 1× SODEX AT-G; |
| Solvent: | 1,2,4 trichlorobenzene (+0.025% 2,6-di-tert-butyl-4-methyl-phenol) |
| Flow rate: | 0.6-1 mL/min |
| Temperature: | 135° C. |
| Detector: | Infrared at λ ≈ 3.5 μm |

Calibration: Universal Calibration with PS-Standard

The intrinsic viscosity (I.V.) was measured in decaline (DHN) at 135° C.

The melting points (T$_m$) and glass transition temperatures (T$_g$) were determined on a DSC30 Mettler instrument equipped with a cooling device, by heating the sample from 25° C. to 200° C. at 20° C./min, holding for 10 min at 200° C., cooling from 200° C. to −140° C., holding for 2 min at −140° C., heating from −140° C. to 200° C. at 20° C./min. The reported values are those determined from the second heating scan.

In cases in which crystallization phenomena overlap with the glass transition, for a better determination of the T$_g$ value, the samples were heated to 200° C. at 20° C./minute, quickly cooled to a temperature lower than the T$_m$ (usually 20, 0 or −20° C.) at 200° C./minute, and kept at this temperature for 720 minutes. The samples were then further quickly cooled to −140° C. at 200° C./minute and finally re-heated to 200° C. at 20° C./minute. The whole process was carried out under nitrogen flow of 20 mL/minute.

Determination of Liquid Phase Composition

The liquid phase composition was calculated from the Redlich-Kwong-Soave equations. This set of thermodynamic equations was selected among those available in Aspen Plus™ (commercialized by Aspen Technology Inc., Release 9) on the basis of a comparison with the experimental results. The concentrations of the comonomers were hence calculated.

Metallocene Compounds

Dimethylsilylbis(2-methyl-4-phenyl-1-indenyl)zirconium dichloride [C1]

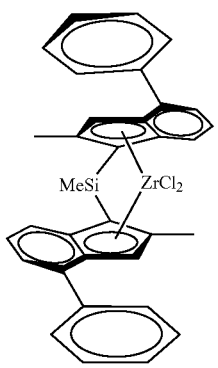

[C1]

was prepared according to U.S. Pat. No. 5,786,432.

dimethylsilylbis(2-methyl-4(4-tertbutyl-phenyl)-1-indenyl)zirconium dichloride [A1]

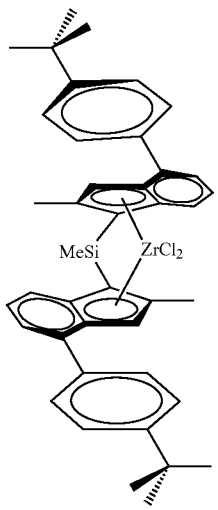

[A1]

was prepared according to WO 98/40331

Polymerization Examples 1-6

General Procedure

Ethylene/1-hexene copolymerizations were carried out in a 260-mL Büchi glass autoclave equipped with magnetic stirrer, thermocouple and feeding line for the monomer, purified with nitrogen and kept in a thermostatic bath. Heptane and 1-hexene (150 mL of total volume, amount of 1-hexene is reported in table 1), and trisobutylaluminum (TIBA) (0.5 mmol) were introduced and warmed to 70° C., then the autoclave was purged with ethylene. The catalytic system was separately prepared in 5 mL of toluene by mixing the amounts of metallocene reported in table 1 and methylalumoxane (MAO) (MAO/Zr ratio 500 mol/mol). After about 30 sec of stirring at room temperature, the solution was introduced into the autoclave under ethylene flow. The reactor was closed and pressurized with ethylene at 4 bar-g; the temperature was raised at 70° C. and the pressure was kept constant by feeding in ethylene. The polymerization was stopped after the time indicate in table 1 by degassing the reactor and by adding 2 mL of methanol. The polymer was precipitated with 200 mL of acetone, filtered, washed with acetone and dried overnight at 60° C. under reduced pressure. Polymerization conditions and polymer data are reported in table 1.

TABLE 1

| Ex | metall. | amount μmol | 1-hexene (g) | 1-hexene liquid phase (% mol) | 1-hexene liquid phase (% wt) | Time (min) | Yield (g) | Activity Kg$_{Pol}$/ (mmol$_{Zr}$*h) | 1-hex copol ($^1$H NMR) (% mol) | $r_1 \times r_2$ | I.V. (dL/g) | Mw/Mn | T$_g$ °C. | T$_m$ °C. |
|---|---|---|---|---|---|---|---|---|---|---|---|---|---|---|
| 1* | C1 | 0.2 | 1.32 | 22.8 | 46.9 | 5 | 0.5 | 30.6 | 10.3 | 1.22 | 2.96 | 2.48 | −44.3 | 82.5 |
| 2* | C1 | 0.3 | 3.29 | 42.4 | 68.8 | 5 | 1.3 | 51.2 | 21.5 | 0.94 | 2.17 | 2.39 | −51.3 | n.d. |
| 3* | C1 | 0.3 | 6.59 | 59.3 | 81.4 | 7 | 1.1 | 30.3 | 32.6 | 0.99 | 1.72 | 2.51 | −56.0 | n.d. |
| 4 | A1 | 0.3 | 1.32 | 22.8 | 46.9 | 3 | 1.0 | 66.0 | 15.8 | 0.80 | 2.8 | 2.59 | −51.6 | 56.6 |
| 5 | A1 | 0.3 | 3.29 | 42.4 | 68.8 | 5 | 1.1 | 43.6 | 26.5 | 0.69 | 2.27 | 2.49 | −57.1 | n.d. |
| 6 | A1 | 0.3 | 6.59 | 59.3 | 81.4 | 5 | 0.8 | 31.2 | 32.3 | 0.82 | 1.92 | 2.46 | −58.2 | n.d. |

*comparative examples
n.d. = not determinable;

The invention claimed is:

1. A process for producing a polymer of ethylene containing from 5% to 40% by mol of derived units of at least one alpha-olefin of formula $CH_2=CHA$, wherein A is a $C_2$-$C_{20}$ alkyl radical and optionally up to 5% by mol polyene, comprising contacting, under polymerization conditions, ethylene, said at least one alpha-olefin and optionally said polyene, in the presence of a non-supported catalyst system obtained by contacting:

a) a metallocene compound of formula (I):

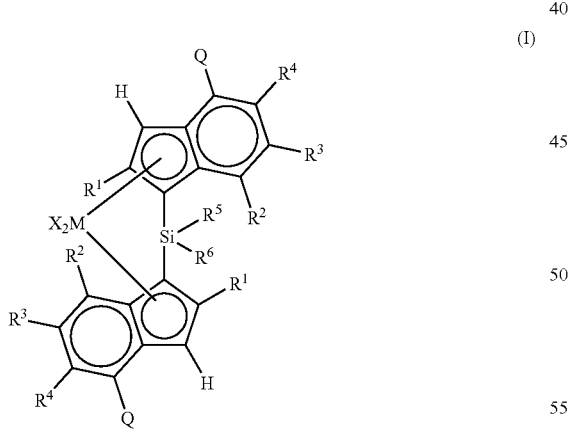

wherein

M is zirconium, titanium or hafnium;

X, equal to or different from each other, is a hydrogen atom, a halogen atom, a R, OR, $OSO_2CF_3$, OCOR, SR, $NR_2$ or $PR_2$ group, wherein the R substituents are linear or branched, $C_1$-$C_{20}$-alkyl, $C_3$-$C_{20}$-cycloalkyl, $C_6$-$C_{20}$-aryl, $C_7$-$C_{20}$-alkylaryl or $C_7$-$C_{20}$-arylalkyl radicals, optionally containing at least one heteroatom belonging to groups 13-17 of the Periodic Table of the Elements; and the R' substituent is a $C_1$-$C_{40}$-alkylidene, $C_6$-$C_{40}$-arylidene, $C_7$-$C_{40}$-alkylarylidene or $C_7$-$C_{40}$-arylalkylidene;

$R^1$, equal to or different from each other, are a linear or branched $C_1$-$C_{20}$-alkyl radical;

$R^2$, equal to or different from each other, is a hydrogen atom or a linear or branched, $C_1$-$C_{20}$-alkyl radical;

$R^3$ and $R^4$, equal to or different from each other, are hydrogen atoms or linear or branched, $C_1$-$C_{20}$-alkyl, $C_3$-$C_{20}$-cycloalkyl, $C_6$-$C_{20}$-aryl, $C_7$-$C_{20}$-alkylaryl or $C_7$-$C_{20}$-arylalkyl radicals, optionally containing at least one heteroatom belonging to groups 13-17 of the Periodic Table of the Elements; or they can form together a condensed saturated or unsaturated 5 or 6 membered ring, optionally containing at least one heteroatom belonging to groups 13-16 of the Periodic Table of the Elements, said ring optionally bearing at least one substituent;

$R^5$ and $R^6$, equal to or different from each other, are hydrogen atoms or linear or branched, $C_1$-$C_{20}$-alkyl, $C_3$-$C_{20}$-cycloalkyl, $C_6$-$C_{20}$-aryl, $C_7$-$C_{20}$-alkylaryl or $C_7$-$C_{20}$-arylalkyl radicals, optionally containing at least one heteroatom belonging to groups 13-17 of the Periodic Table of the Elements; or they can form together a condensed saturated or unsaturated 5 or 6 membered ring, optionally containing at least one heteroatom belonging to groups 13-16 of the Periodic Table of the Elements, said ring optionally bearing at least one substituent;

Q is a radical of formula (IIa) which is bonded to the indenyl at the position marked by the symbol *;

wherein $R^9$ is a group of formula $C(R^{12})_3$ wherein $R^{12}$, same or different, is a linear or branched, $C_1$-$C_6$-alkyl radical, and the metallocene compound of formula (I) is in the racemic form; and b) an alumoxane.

2. The process according to claim 1 wherein the catalyst system further comprises an organo aluminum compound.

3. The process according to claim 1 wherein in the compound of formula (I), X is a halogen atom, an R, or OR group; $R^3$ and $R^4$ are hydrogen atoms, methyl or they form a condensed saturated or unsaturated 5 or 6 membered ring; and $R^5$ and $R^6$ are $C_1$-$C_{20}$-alkyl or $C_6$-$C_{20}$-aryl radicals.

4. The process according to claim 1 wherein the alpha-olefin is 1-butene, 1-pentene, 4-methyl-1-pentene, 1-hexene, 1-octene, 4,6-dimethyl-1-heptene, 1-decene, 1-dodecene, 1-tetradecene, 1-hexadecene, 1-octadecene or 1-eicosene.

5. The process according to claim 4 wherein the alpha-olefin is 1-pentene, 1-hexene or 1-octene.

* * * * *